United States Patent [19]

Ito

[11] Patent Number: 5,378,563

[45] Date of Patent: Jan. 3, 1995

[54] METHOD FOR CORRECTING IMAGE DENSITY IN THERMO-OPTIC RECORDING

[75] Inventor: Wataru Ito, Kanagawa, Japan

[73] Assignee: Fuji Photo Film Co., Ltd., Kanagawa, Japan

[21] Appl. No.: 130,237

[22] Filed: Oct. 1, 1993

[30] Foreign Application Priority Data

Oct. 7, 1992 [JP] Japan .................................. 4-268516

[51] Int. Cl.⁶ .............................................. G03C 5/02
[52] U.S. Cl. ...................................... 430/30; 430/332; 430/945
[58] Field of Search ................. 430/30, 945, 332, 333, 430/335; 503/201

[56] References Cited

U.S. PATENT DOCUMENTS

| | | | |
|---|---|---|---|
| 4,211,558 | 7/1980 | Oguchi et al. | 430/359 |
| 4,894,685 | 1/1990 | Shoji | 355/246 |
| 5,234,797 | 8/1993 | Satake et al. | 430/338 |
| 5,283,141 | 2/1994 | Yoon et al. | 430/30 |

FOREIGN PATENT DOCUMENTS

| | | | |
|---|---|---|---|
| 50-23617 | 3/1975 | Japan . | |
| 58-94494 | 6/1983 | Japan . | |
| 61-291183 | 12/1986 | Japan . | |
| 62-77983 | 4/1987 | Japan . | |
| 62-78964 | 4/1987 | Japan . | |
| 63-036253 | 2/1988 | Japan | 430/30 |
| 362684 | 3/1991 | Japan . | |
| 4147870 | 5/1992 | Japan . | |
| 524219 | 2/1993 | Japan . | |

*Primary Examiner*—Charles L. Bowers, Jr.
*Assistant Examiner*—John A. McPherson
*Attorney, Agent, or Firm*—Sughrue, Mion, Zinn, Macpeak & Seas

[57] ABSTRACT

A laser beam is modulated with an image signal, a thermosensitive recording material, which is composed of a substrate and a color forming agent, a developing agent, and a light absorbing dye, which are overlaid on the substrate, is scanned with the modulated laser beam, and an image represented by the image signal is thereby recorded on the thermosensitive recording material. Before the image is recorded on the thermosensitive recording material, a density pattern constituted of a plurality of sections whose densities vary stepwise is recorded on a portion of the thermosensitive recording material with the laser beam. Densities of the respective sections of the density pattern recorded on the thermosensitive recording material are measured. From the results of measurements, a conversion table is created for use in conversion processing on the image signal such that the image may be recorded with an appropriate image density range on the thermosensitive recording material. The image signal is converted in accordance with the conversion table when the image is recorded on the thermosensitive recording material, on which the density pattern has been recorded.

4 Claims, 2 Drawing Sheets

METHOD FOR CORRECTING IMAGE DENSITY IN THERMO-OPTIC RECORDING

BACKGROUND OF THE INVENTION

1. Field of the Invention

This invention relates to a method for correcting image density in thermo-optic recording, wherein the image density of an image recorded on a thermosensitive recording material is prevented from fluctuating due to various factors concerning the image recording in an apparatus for scanning the thermosensitive recording material with a laser beam modulated in accordance with an image signal and thereby recording the image thereon.

2. Description of the Prior Art

Optical scanning recording apparatuses have heretofore been used wherein a laser beam is modulated in accordance with an image signal, a photosensitive material is scanned with the modulated laser beam, and an image represented by the image signal is thereby recorded on the photosensitive material.

Recently, thermo-optic recording apparatuses (i.e. thermal types of optical scanning recording apparatuses) have been proposed wherein a laser beam is utilized as a heat source, thermal energy of the laser beam is given to a thermosensitive recording material, and an image is thereby recorded on the thermosensitive recording material.

In the thermo-optic recording apparatuses, a laser is utilized in the heat mode. They have the advantages in that a visible image can be obtained with thermal energy simultaneously with the input of a signal and in that additional developing and fixing operations are not required. Such apparatuses are disclosed in, for example, Japanese Unexamined Patent Publication Nos. 50(1975)-23617, 58(1983)-94494, 62(1987)-77983, and 62(1987)-78964.

However, with the thermo-optic recording apparatuses described above, a thermosensitive color forming layer of the thermosensitive recording material does not easily absorb light having wavelengths falling within the wavelength distribution ranges of visible light and infrared rays, and therefore the output power of the laser must be made very large. Accordingly, it was difficult for the thermo-optic recording apparatuses described above to be made small in size and low in cost.

In order to solve the aforesaid problems, the applicant proposed a novel thermosensitive recording material which is capable of recording good images having good image quality. The proposed thermosensitive recording material comprises a substrate and a color forming agent, a developing agent, and a light absorbing dye, which are overlaid on the substrate. The proposed thermosensitive recording material forms a color having a density according to the level of thermal energy applied thereto. The applicant also proposed an apparatus for recording an image on the thermosensitive recording material by using a laser beam. The novel thermosensitive recording material and the apparatus for recording an image thereon are proposed in Japanese Patent Application No. 3(1991)-62684 and Japanese Unexamined Patent publication No. 5(1993)-24219.

As proposed in Japanese Patent Application No. 3(1991)-62684, the thermosensitive recording material comprises the substrate and a thermosensitive recording layer overlaid on the substrate. The thermosensitive recording layer is formed by applying a coating composition to the substrate. The coating composition contains an emulsion, which is prepared by dissolving microcapsules containing at least a basic dye precursor, a developing agent, and a light absorbing dye into an organic solvent that is sparingly soluble or insoluble in water, and thereafter emulsifying and dispersing the dissolved materials.

The basic dye precursor has properties such that it may form a color by donating electrons or accepting protons from an acid, or the like. Ordinarily, the basic dye precursor comprises a compound, which is approximately colorless and has a partial skeleton of lactone, lactam, sultone, spiropyran, ester, amide, or the like, that can undergo ring opening or cleavage when being brought into contact with the developing agent. Specifically, the basic dye precursor may be crystal violet lactone, benzoyl leucomethylene blue, malachite green lactone, rhodamine B lactam, 1,3,3-trimethyl-6'-ethyl-8'-butoxyindolino-benzospiropyran, or the like.

As the developing agent for the color forming agent, an acid substance, such as a phenolic compound, an organic acid or its metal salt, or a hydroxybenzoic acid ester, may be used. The developing agent should preferably have a melting point falling within the range of 50° C. to 250° C. In particular, a phenol or an organic acid, which is sparingly soluble in water and has a melting point falling within the range of 60° C. to 200° C., is desirable as the developing agent. Examples of the developing agents are disclosed in, for example, Japanese Unexamined Patent Publication No. 61(1986)-291183.

The light absorbing dye should preferably be selected from dyes, which absorb less light having wavelengths falling within the wavelength distribution range of visible light and have a particularly high absorptivity with respect to light having wavelengths falling within the wavelength distribution range of infrared rays. Examples of such dyes include cyanine dyes, phthalocyanine dyes, pyrylium and thiopyrylium dyes, azulenium dyes, squarylium dyes, metal complex dyes containing Ni, Cr, or the like, naphthoquinone and anthraquinone dyes, indophenol dyes, indoaniline dyes, triphenylmethane dyes, triallylmethane dyes, aminium and diimmonium dyes, and nitroso compounds. Among the above-enumerated dyes, the dyes which have a high absorptivity with respect to light having wavelengths falling within the range of 700nm to 900nm in the near infrared region are more preferable. This is because semiconductor lasers capable of producing near infrared laser beams have been put to practical use.

However, in the thermo-optic recording apparatuses described above, even if the image signal is the same, the image density of the image recorded with a laser beam modulated in accordance with the image signal will vary due to, for example, fluctuations in the diameter of the laser beam produced by a laser beam source, such as a semiconductor laser, and a difference between thermosensitive recording materials.

In particular, if the image density fluctuates in the manner described above during the operations for recording images for medical purposes, which images are required to have particularly high gradation, the image quality of the images will become worse and the images cannot serve as an effective tool in the efficient and accurate diagnosis of an illness.

A method for correcting image density in an image recording operation is disclosed in, for example, Japanese Unexamined Patent Publication No. 4(1992)147870. With the disclosed method, a thermal head is used as a heating means, and an image is recorded on a recording material by driving the thermal head. Before the image is recorded on the recording material, a plurality of density patterns are recorded on the forward side, which is taken in the direction along which the thermal head passes. Thereafter, the densities of the recorded density patterns are measured, and a correction is made in accordance with the results of measurements of the densities such that the image which is then recorded on the recording material may have an appropriate level of image density.

However, as compared with the recording method utilizing the scanning with a laser beam, the thermal recording method utilizing a thermal head is disadvantageous in that the recording speed and the resolution of the recorded image are lower. Therefore, the recording method utilizing a laser beam is practically more useful.

SUMMARY OF THE INVENTION

The primary object of the present invention is to provide a method for correcting image density in thermo-optic recording, wherein a density pattern composed of a plurality of sections is recorded on each thermosensitive recording material, and a correction is made in accordance with density having been measured for each section of the density pattern such that an image recorded on the thermosensitive recording material may have an appropriate level of image density.

Another object of the present invention is to provide a method for correcting image density in thermo-optic recording, wherein image density of an image recorded on a thermosensitive recording material is corrected very accurately regardless of a difference between thermosensitive recording materials.

The present invention provides, in a thermo-optic recording apparatus wherein a laser beam is modulated in accordance with an image signal, a thermosensitive recording material, which is composed of a substrate and a color forming agent, a developing agent, and a light absorbing dye, which are overlaid on the substrate, is scanned with the modulated laser beam, and an image represented by the image signal is thereby recorded on the thermosensitive recording material, a method for correcting image density in thermo-optic recording, comprising the steps of:
  i) recording a density pattern, which is constituted of a plurality of sections whose densities vary stepwise, on a portion of the thermosensitive recording material with the laser beam before the image is recorded on the thermosensitive recording material.
  ii) measuring the densities of the respective sections of the density pattern having been recorded on the portion of the thermosensitive recording material,
  iii) creating a conversion table in accordance with the results of measurements of the densities of the respective sections of the density pattern, the conversion table being used during conversion processing carried out on the image signal such that the image may be recorded with an appropriate image density range on the thermosensitive recording material, and
  iv) carrying out conversion processing on the image signal in accordance with the conversion table when the image is recorded on the thermosensitive recording material, on which the density pattern has been recorded.

Specifically, with the method for correcting image density in thermo-optic recording in accordance with the present invention, before the image is recorded on the thermosensitive recording material by scanning it with the laser beam, the laser beam is set such that the density on the portion of the thermosensitive recording material may vary stepwise. The density pattern, which is constituted of a plurality of sections whose densities vary stepwise, is thereby recorded on the portion of the thermosensitive recording material. The densities of the respective sections of the density pattern are then measured, and the density characteristics between the thermosensitive recording material and the laser beam are thereby calculated. When the image is recorded on the thermosensitive recording material, a correction of image density is made in accordance with the density characteristics. In this manner, an image having appropriate gradation is obtained.

The term "sections of a density pattern" as used herein means comparatively small regions having certain densities, which are obtained by exposing the thermosensitive recording material to the laser beam.

Therefore, the term "density pattern" as used herein means a region constituted of a plurality of sections, the densities of which vary stepwise and which are recorded on the thermosensitive recording material by irradiating the laser beam having been modulated in a plurality of steps to the thermosensitive recording material.

With the method for correcting image density in thermo-optic recording in accordance with the present invention, before the image is recorded on the thermosensitive recording material, the density pattern is recorded on the portion of the thermosensitive recording material. The densities of the respective sections of the density pattern are measured, and the conversion table for conversion of the image signal into a signal representing the image having an appropriate level of image density is thereby created. In this manner, the density pattern is recorded on each thermosensitive recording material, the densities of the sections of the density pattern are measured, and a conversion table is thereby created and used during the conversion of the image signal. Therefore, even if various differences occur among a plurality of thermosensitive recording materials, a correction of image density can be made accurately for each of the thermosensitive recording materials.

As described above, with the method for correcting image density in thermo-optic recording in accordance with the present invention, the density pattern is recorded on the thermosensitive recording material, on which the image is to be recorded, and the conversion table is thereby created. When the image is recorded on the thermosensitive recording material, the image signal is converted in accordance with the conversion table. Therefore, images free of fluctuations in image density can be obtained under desired image signal vs. image density characteristics.

Also, in the method for correcting image density in thermo-optic recording in accordance with the present invention, the conversion table, which has been obtained in accordance with the density pattern having been recorded on a certain thermosensitive recording material, is utilized during the image recording operation carried out on the same thermosensitive recording material. Therefore, a very accurate correction of image density can be carried out regardless of differences among thermosensitive recording materials.

DESCRIPTION OF THE PREFERRED EMBODIMENTS

The present invention will hereinbelow be described in further detail with reference to the accompanying drawings.

Figure 1:
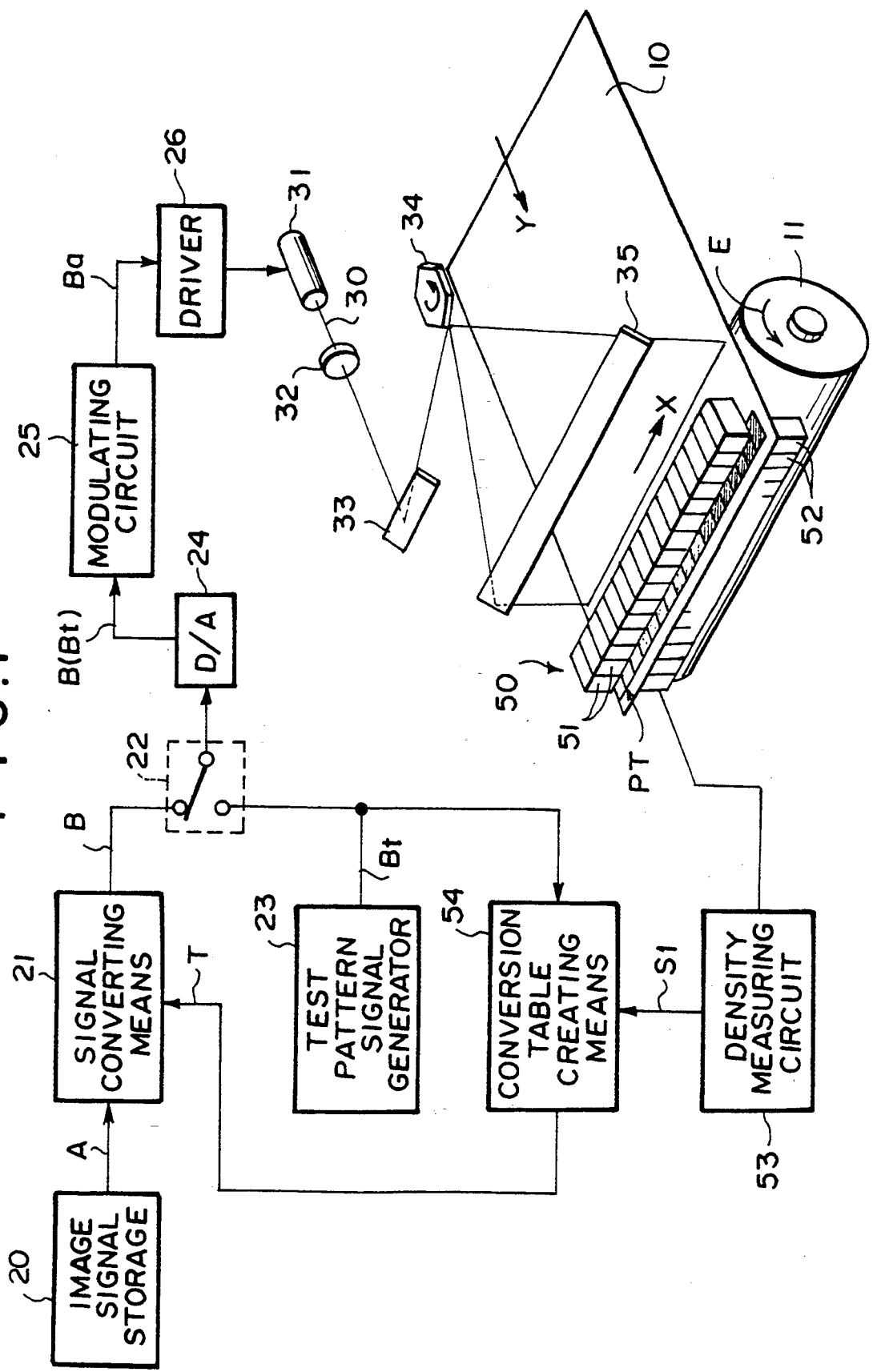
FIG. 1 is an explanatory view showing a thermo-optic recording apparatus for carrying out an embodiment of the method for correcting image density in thermo-optic recording in accordance with the present invention.

FIG. 1 shows an example of a thermo-optic recording apparatus for carrying out an embodiment of the method for correcting image density in thermo-optic recording in accordance with the method of the present invention. A thermosensitive recording film 10 used in this embodiment is a thermosensitive recording material for an image recording operation in a laser heat mode. As disclosed in, for example, Japanese Patent Application No. 3(1991)-62684, the thermosensitive recording film 10 comprises a substrate, which is transparent with respect to visible light, and a color forming agent, a developing agent, and a light absorbing dye, which are overlaid on the substrate. The thermosensitive recording film 10 forms a color having density according to the level of thermal energy applied thereto.

The thermosensitive recording film 10 is placed on a drum 11, which can be rotated in the direction indicated by the arrow E. The thermosensitive recording film 10 is conveyed on the drum 11 in the direction indicated by the arrow Y, i.e. in the sub-scanning direction of a laser beam 30.

A digital image signal A is stored in an image signal storage device 20. The digital image signal A is fed into a signal converting means 21, which converts it into a signal B in accordance with a conversion table as will be described later. The signal B thus obtained is fed through a signal input change-over means 22 into a D/A converter 24, which converts the signal B into an analog signal B. The analog signal B is fed into a modulation circuit 25. An analog signal Ba, which has been modulated by the modulation circuit 25, is used to control a driver 26 for a semiconductor laser 31, and the laser beam 30 is thereby produced by the semiconductor laser 31. The laser beam 30, which has been produced by the semiconductor laser 31, is collimated by a collimator lens 32. The collimated laser beam 30 is reflected by a mirror 33 and then by a rotating polygon mirror 34. Thereafter, the laser beam 30 is reflected by a long mirror 35 and is thereby caused to scan the thermosensitive recording film 10 in the main scanning direction indicated by the arrow X, which direction is approximately normal to the sub-scanning direction indicated by the arrow Y.

The thermosensitive recording film 10 is thus scanned with the laser beam 30 in the main scanning direction and in the sub-scanning direction. In this manner, as illustrated in FIG. 2, an image K represented by the signal B is recorded on the thermosensitive recording film 10.

Before the image K is recorded on the thermosensitive recording film 10 in the manner described above, the signal input change-over means 22 is set such that a test pattern signal generating device 23 may be connected to the modulation circuit 25. The test pattern signal generating device 23 generates a test pattern signal Bt. The test pattern signal Bt is fed into the modulation circuit 25. In this manner, as illustrated in FIG. 2, a density pattern PT represented by the test pattern signal Bt is recorded on the thermosensitive recording film 10. The density pattern PT comprises a plurality of sections PT1, PT2, . . . , PTn whose densities vary stepwise. The sections PT1, PT2, . . . , PTn stand in a line along the direction, which is normal to the subscanning direction Y along which the thermosensitive recording film 10 is moved. By way of example, approximately 16 such sections are recorded on the thermosensitive recording film 10.

When the density pattern PT has been recorded on the thermosensitive recording film 10, the signal input change-over means 22 is set such that the signal converting means 21 may be connected to the modulation circuit 25. Thereafter, in the manner described above, the image K is recorded on the thermosensitive recording film 10.

Figure 2:
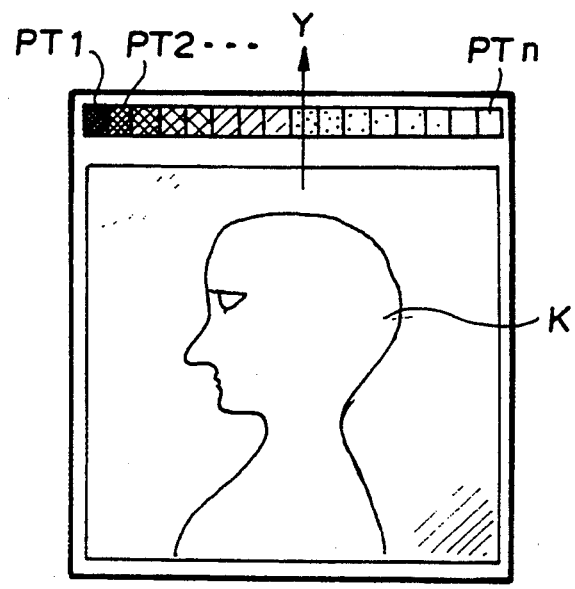
FIG. 2 is a plan view showing a sheet of thermosensitive recording film, on which a density pattern and an image have been recorded with the thermo-optic recording apparatus shown in FIG. 1.

Therefore, as illustrated in FIG. 2, the density pattern PT is recorded on the forward side of the thermosensitive recording film 10, which side is taken in the direction along which the thermosensitive recording film 10 is moved (i.e. in the direction indicated by the arrow Y). Also, the image K is recorded on the side more rearward than the density pattern PT on the thermosensitive recording film 10.

A density measuring means 50 is located on the side more forward than the position on the thermosensitive recording film 10 that is scanned with the laser beam 30, the forward side being taken in the direction along which the thermosensitive recording film 10 is conveyed. By way of example, the density measuring means 50 is provided with n number of light sources 51, 51, . . . , which may be constituted of LEDs, or the like. The light sources 51, 51, . . . are located side by side in an array form so as to stand facing the respective sections PT1, PT2, . . . , PTn. The density measuring means 50 is also provided with n number of photodetectors 52, 52, . . . , which may be constituted of photodiodes, or the like. The photodetectors 52, 52, . . . are located in an array form so as to stand facing the respective light sources 51, 51, . . . with the sections PT1, PT2, . . . , PTn intervening therebetween. The density measuring means 50 is further provided with a density measuring circuit 53, which receives outputs from the photodetectors 52, 52, . . . The photodetectors 52, 52, . . . detect the intensity of measuring light, which has been produced by the respective light sources 51, 51, . . . and which has then passed through the thermosensitive recording film 10. In this manner, the densities of the respective sections PT1, PT2, . . . , PTn are measured.

The density measuring circuit 53 generates n number of density signals S1, S1, . . . representing the densities of the sections PT1, PT2, . . . , PTn and feeds the signals into a conversion table creating means 54. In accordance with the received density signals S1, S1, . . . , the conversion table creating means 54 creates a conversion table T to be used during the conversion of the image signal A into the signal B. The conversion table T is set in the signal converting means 21.

How the conversion table T is created will hereinbelow be described in detail.

The conversion table creating means 54 calculates the actual relationship between the pattern density D, which is represented by each density signal S1, and the test pattern signal Bt given by the test pattern signal generating device 23. At this time, the pattern density D, which has been measured from the output of an m'th photodetector 52, and the level of the test pattern signal Bt, which corresponds to an m'th section PTm, are found, and the relationship therebetween is calculated. The relationship thus calculated is approximately represented by the curve shown at the first quadrant in FIG. 3.

Figure 3:
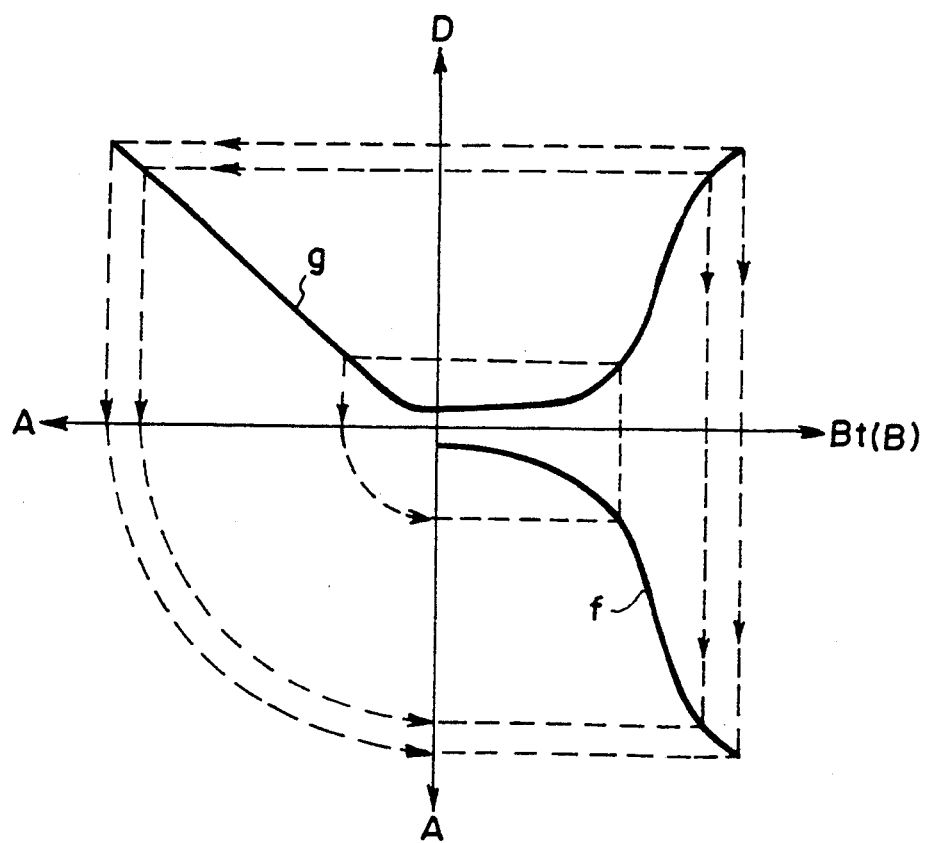
FIG. 3 is an explanatory graph showing how a conversion table is created and how it works in the thermo-optic recording apparatus shown in FIG. 1.

Also, the conversion table creating means 54 stores information representing desired image signal vs. image density characteristics g, i.e. the relationship between the image signal A and the pattern density D on the thermosensitive recording film 10, as shown at the second quadrant in FIG. 3. The conversion table creating means 54 creates the conversion table T from the image signal vs. image density characteristics g and the relationship between the test pattern signal Bt and the pattern density D.

Specifically, the conversion table creating means 54 calculates the level of the image signal A, which yields the image density D corresponding to each level of the test pattern signal Bt under the image signal vs. image density characteristics g. Thereafter, the conversion table creating means 54 calculates the relationship f (indicated at the fourth quadrant in FIG. 3) between the image signal A and the test pattern signal Bt.

During the calculation of the relationship f between the image signal A and the test pattern signal Bt, such relationships are calculated for several levels (in this case, 16 levels) of the test pattern signal Bt having been actually utilized to record the density pattern PT. Thereafter, the continuous relationship f can be calculated by interpolation from the relationships having been calculated for the several levels of the test pattern signal Bt. The conversion table creating means 54 creates the conversion table T, which is to be used during the conversion of the image signal A into the signal B, from the relationship f between the image signal A and the test pattern signal Bt. The conversion table T thus created is set in the signal converting means 21.

Thereafter, the image represented by the image signal A, which is fed out from the image signal storage device 20, is recorded at the predetermined position on the thermosensitive recording film 10 (i.e. at the position more rearward than the density pattern PT) in the manner described above. At this time, the image signal A is converted into the signal B in accordance with the conversion table T in the signal converting means 21. As a result, the relationship between the image signal A and the image density D on the thermosensitive recording film 10 becomes identical with the desired relationship, which is indicated at the second quadrant in FIG. 3.

As described above, it often occurs that the relationship between the test pattern signal Bt and the image density D shown in FIG. 3 fluctuates due to a difference between sheets of the thermosensitive recording film 10, fluctuations in the characteristics of the laser beam 30, or the like. However, even if the relationship between the test pattern signal Bt and the image density D fluctuates in various ways, a conversion table T can be created from the current relationship between the test pattern signal Bt and the image density D and from the aforesaid desired image signal vs. image density characteristics g (which are indicated at the second quadrant in FIG. 3), and an image can be recorded under the predetermined characteristics described above.

Also, in this embodiment, during the operations for recording the images on sheets of the thermosensitive recording film 10, the density pattern PT is recorded on each sheet of the thermosensitive recording film 10, and a corresponding conversion table T is created. Therefore, the conversion table T is optimized each time the image recording operation is carried out, and an image having stable image density can always be obtained.

In the aforesaid embodiment, the measurements of the densities of the sections PT1, PT2, ..., PTn are carried out by using an array of the light sources 51, 51, ... and an array of the photodetectors 52, 52, ... Alternatively, the measurements may be carried out by using a mechanism, which one-dimensionally scans a pair of a light source and a photodetector in the direction, along which the sections PT1, PT2, ..., PTn stand side by side.

Further, in the aforesaid embodiment, the conversion table T is created for each sheet of the thermosensitive recording film 10. Alternatively, the conversion table T may be created when sheets of the thermosensitive recording film 10 belonging to a different production lot are used. As another alternative, the conversion table T may be created when a predetermined length of time has elapsed during the image recording operations.

The densities of the sections PT1, PT2, ..., PTn do not always have linear relationship therebetween. If such sections PT1, PT2, ..., PTn are regularly located side by side in the order in which the density becomes higher or lower, there will be the risk that a person, who views the density pattern PT and the image K recorded on the thermosensitive recording film 10, makes an incorrect judgment as to whether the state of gradation of the image K is or is not good by viewing the state of gradation of the density of the density pattern PT.

In order to avoid such problems, as the test pattern signal Bt fed out from the test pattern signal generating device 23, a test pattern signal Bt' may be employed which represents a density pattern PT' such that a plurality of sections PT1, PT2, ..., PTn, whose densities vary stepwise, may be located in random order.

What is claimed is:

1. In a thermo-optic recording apparatus wherein a laser beam is modulated in accordance with an image signal, a thermosensitive recording material, which is composed of a substrate and a color forming agent, a developing agent, and a light absorbing dye, which are overlaid on the substrate, is scanned with the modulated laser beam, and an image represented by the image signal is thereby recorded on the thermosensitive recording material, a method for correcting image density in thermo-optic recording, comprising the steps of:

i) recording a density pattern, which is constituted of a plurality of sections whose densities vary stepwise, on a portion of the thermosensitive recording material with the laser beam before the image is recorded on the thermosensitive recording material, ii) measuring the densities of the respective sections of the density pattern having been recorded on the portion of the thermosensitive recording material, iii) creating a conversion table in accordance with the results of measurements of the densities of the respective sections of the density pattern, the conversion table being used during conversion processing carried out on the image signal such that the image may be recorded with an appropriate image density range on the thermosensitive recording material, and iv) carrying out conversion processing on the image signal in accordance with the conversion table when the image is recorded on the thermosensitive recording material, on which the density pattern has been recorded; wherein the plurality of sections of the density pattern, whose densities vary stepwise, are located in a random order.

2. A method as defined in claim 1 wherein the thermosensitive recording material is two-dimensionally scanned with the modulated laser beam.

3. A method as defined in claim 1 wherein the laser beam is a semiconductor laser beam.

4. A method as defined in claim 1 wherein the image is an image for medical purposes.

* * * * *